United States Patent [19]

Bridges et al.

[11] Patent Number: 4,478,171
[45] Date of Patent: Oct. 23, 1984

[54] VARIABLY DISPLACEABLE SPRAY NOZZLES

[75] Inventors: William G. Bridges, Athens; Craig A. Foster, Cleveland, both of Tenn.

[73] Assignee: Olin Corporation, New Haven, Conn.

[21] Appl. No.: 528,811

[22] Filed: Sep. 2, 1983

[51] Int. Cl.³ .............................................. B05B 15/00
[52] U.S. Cl. ....................................... 118/64; 427/242; 425/222; 264/117; 118/303
[58] Field of Search ................... 118/64, 303, 19, 20, 118/; 425/222; 427/242; 264/117

[56] References Cited

U.S. PATENT DOCUMENTS

| | | | |
|---|---|---|---|
| T980,005 | 3/1979 | Shirley, Jr. | 264/7 |
| 3,101,040 | 8/1963 | Lantz | 99/235 |
| 3,333,297 | 8/1967 | Tytus et al. | 18/1 |
| 3,507,249 | 4/1970 | Rollette | 118/303 X |
| 3,544,267 | 12/1970 | Dychdala | 23/86 |
| 3,580,545 | 5/1971 | O'Brien | 259/3 |
| 3,645,005 | 2/1972 | Dychdala et al. | 34/22 |
| 3,793,216 | 2/1974 | Dychdala et al. | 252/187 |
| 3,877,415 | 4/1975 | Blouin | 118/303 |
| 3,894,882 | 7/1975 | Takewell et al. | 186/288 |
| 3,991,225 | 11/1976 | Blouin | 427/3 |
| 4,127,388 | 11/1978 | Maczko et al. | 422/258 |
| 4,258,024 | 3/1981 | Hoffer et al. | 423/474 |
| 4,272,234 | 6/1981 | Tse | 425/222 |
| 4,328,200 | 5/1982 | Welch et al. | 423/474 |
| 4,353,852 | 10/1982 | Tse | 264/37 |
| 4,355,014 | 10/1982 | Murakami et al. | 423/265 |

Primary Examiner—Shrive P. Beck
Attorney, Agent, or Firm—Ralph D'Alessandro; Donald F. Clements; Thomas P. O'Day

[57] ABSTRACT

In a rotary drum spray grainer there are provided adjustable spraying nozzles in the spraying zone to achieve optimum spray pattern dispersion on the spray grained particles as the particles fall through the spraying zone.

41 Claims, 7 Drawing Figures

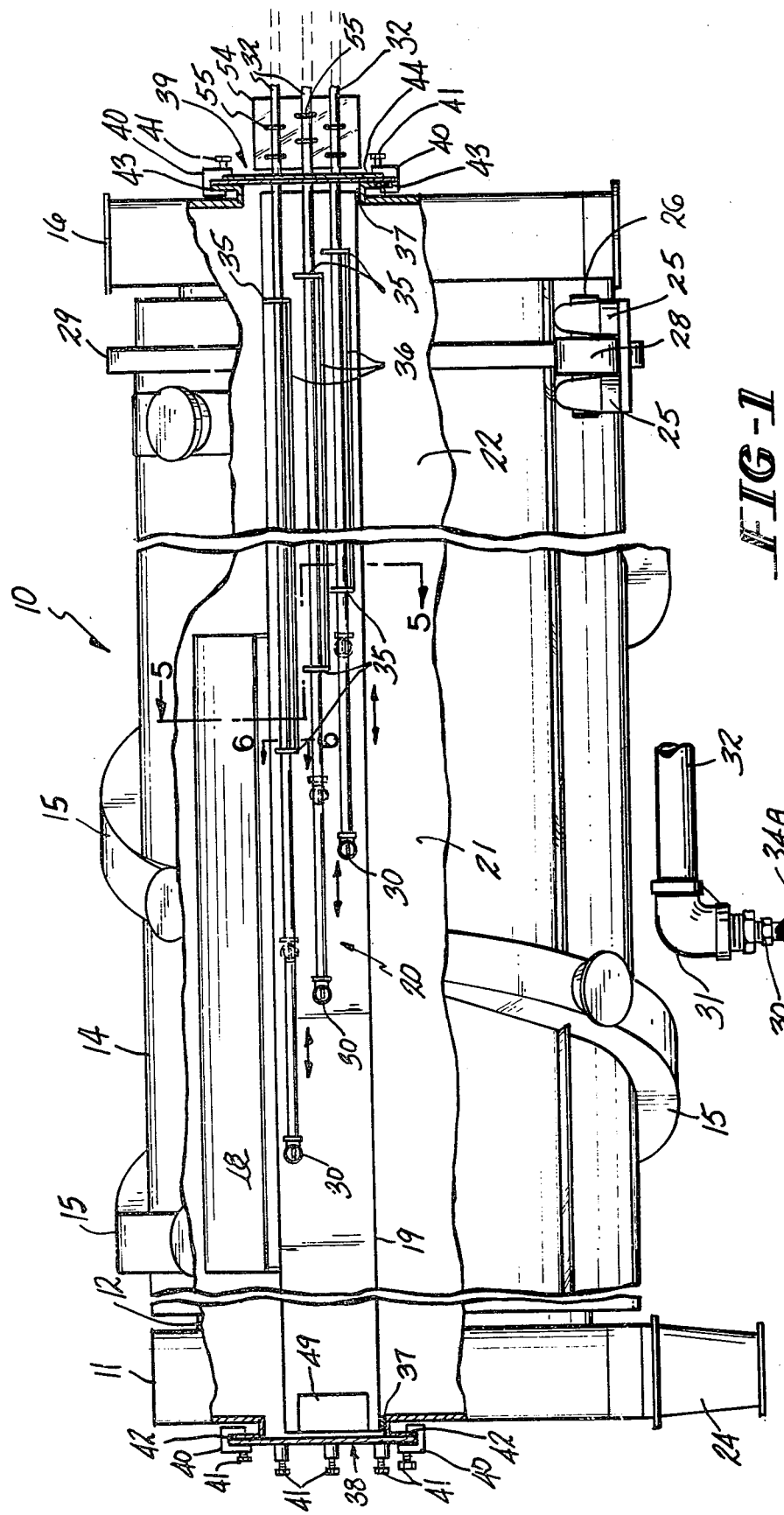
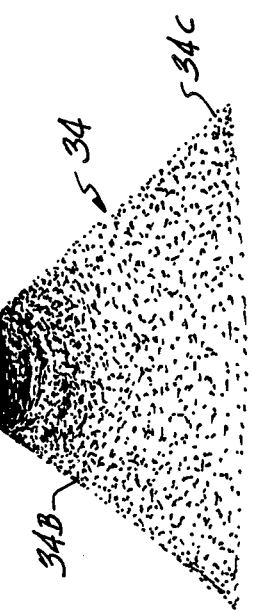
FIG-1
FIG-2

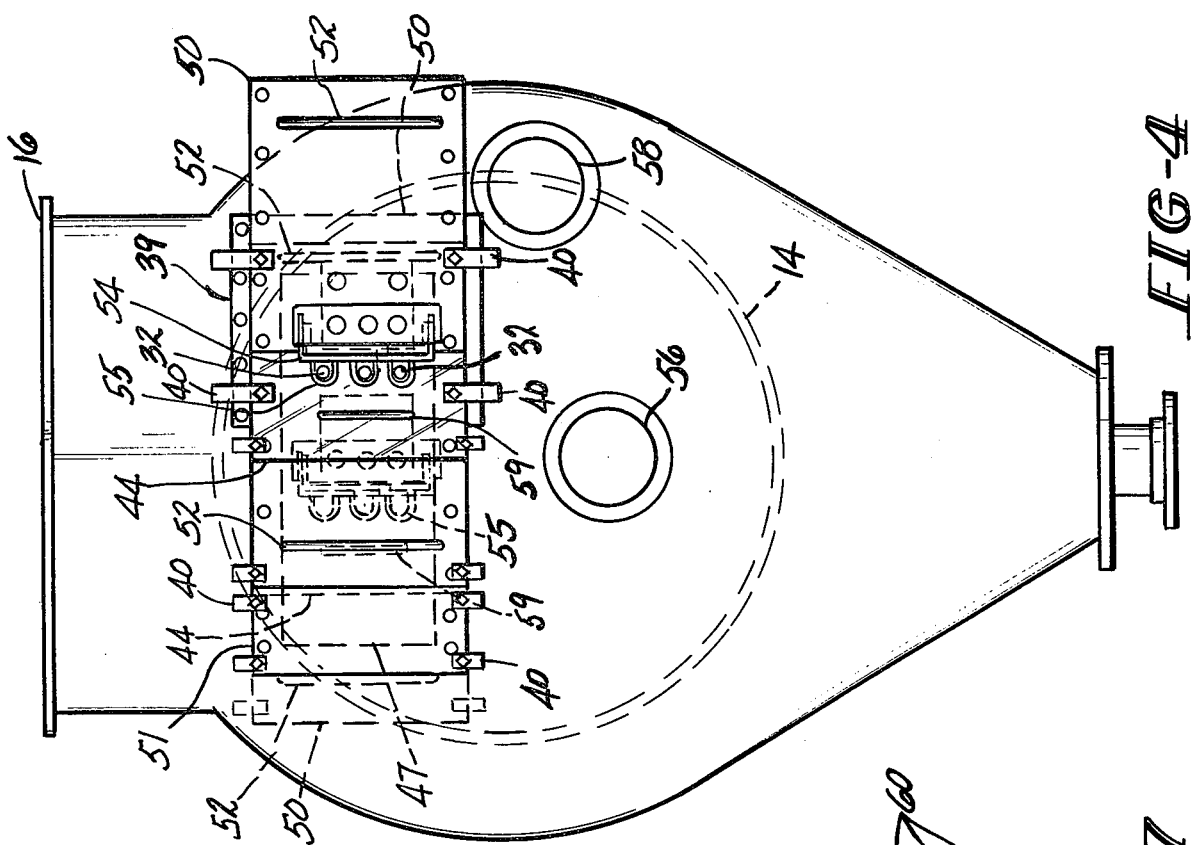
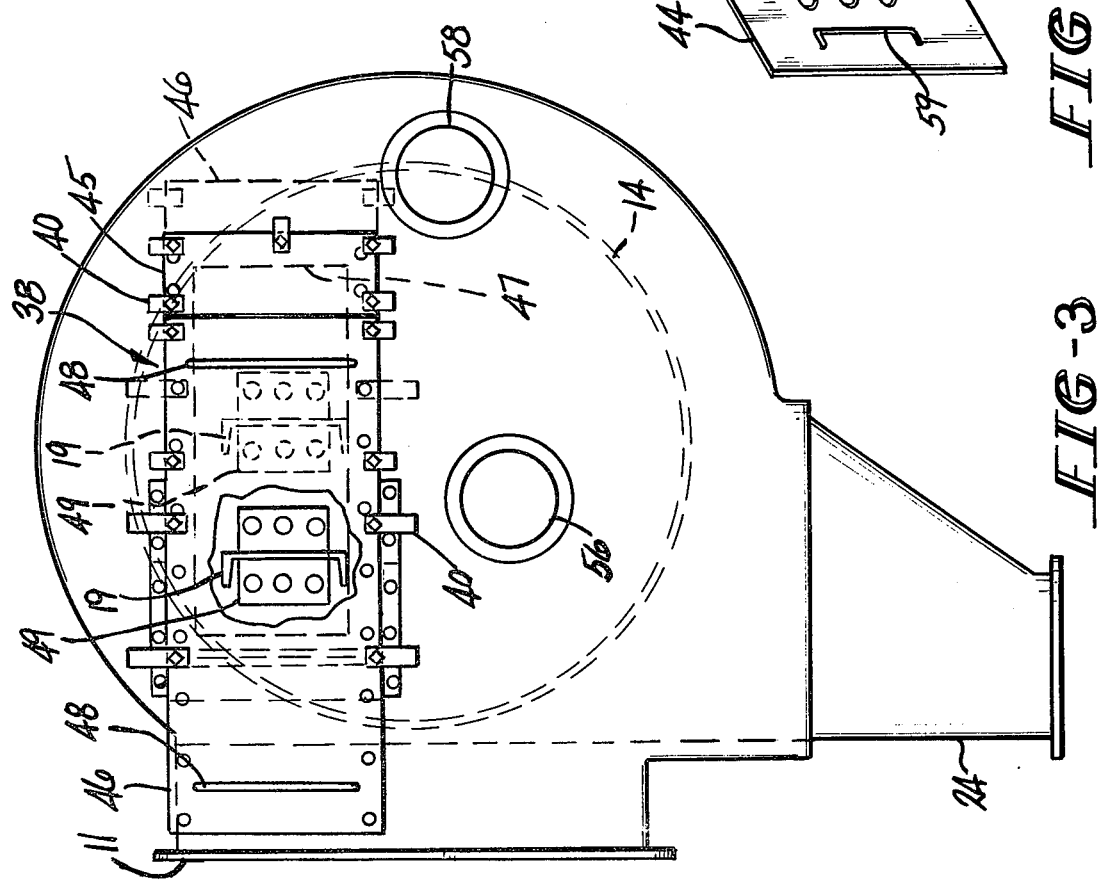

VARIABLY DISPLACEABLE SPRAY NOZZLES

BACKGROUND OF THE INVENTION

This invention relates generally to rotary spray grainers and more particularly to the use of adjustable spraying means or nozzles in a spray grainer to optimize the spray's dispersion on the falling cascades of spray grained calcium hypochlorite.

The use of a rotary drum apparatus to apply coatings or encapsulations to particulate substrates by the spraying of slurries, melts, or solutions and suspensions onto moving beds of particles that fall in cascades within the apparatus is well known. The application of distinct and separate coatings to a particulate substrate is known as granulation and is widely used in the fertilizer industry, for example in the production of ammonium nitrate. The application of coatings or encapsulations on a particulate substrate can also be employed in the making of confections, such as sugars, or, as in the case of the instant invention, in the manufacture of calcium hypochlorite for use as a commercial bleaching and sanitizing agent, particularly in the disinfection of swimming pool waters.

Previous attempts to employ a rotary drum dryer in the process of manufacturing spray grained particles have employed either a deflector means that runs the entire length of the rotary drum and which overlies the spraying means or nozzles or, in the alternative, utilize no deflector means in the rotary drum. In both of these approaches the spraying means or nozzles have been permanently emplaced within the spraying zone of the rotary drum spray grainer so that the distance from the falling cascades of particles and the angle of spray of the nozzles or spraying means into the falling cascades have not been able to be varied. Similarly, the positioning of the nozzles or spraying means relative to the longitudinal axial length of the drum has been fixed so that the nozzles couldn't be adjusted laterally along or parallel to the longitudinal axis of the drum. These prior art designs prevent the rotary spray grainer from achieving its optimum operating efficiency.

In apparatus which does not employ a deflector plate and which is rotated at a sufficient speed to obtain a full cascade of falling particles across the entire cross-sectional area, the slurried material being sprayed on the particulate particles does not achieve optimum spray pattern dispersion to uniformly wet the particles. The slurry is formed from a solid or semi-solid that is reduced to a sprayable liquid state by melting or by dissolution or suspension in an appropriate solvent. Frequently in this type of apparatus, the slurry will penetrate the falling wall or cascade of particulate substrate or particles and build up on the interior walls of the drum, creating scaling. Alternately, in this type of apparatus the falling cascade of the particulate substrate will fall in a path that causes it to strike the spraying nozzles or spraying means, thereby causing the spraying means or nozzles to clog and build up an accumulation of the slurry being sprayed.

Another approach not utilizing a deflector plate or deflector means in a rotary spray grainer uses rods disposed substantially parallel to each other and to the longitudinal axis of the drum radially inwardly of the interior walls of the drum. These rods facilitate the falling of particles in cascades or curtains so that the agglomerating agent or slurry may be sprayed into the cascades. However, this design still suffers from the disadvantage of permitting the particles to impinge on the spraying nozzles and thereby cause clogging or to fall in cascades so close to the nozzles that localized overwetting occurs to some of the particles, while others are not sufficiently wet.

In rotary drum dryers or spray grainers not utilizing deflector plates or other deflector means, avoidance of the impingement of particles on the spraying means has been achieved by keeping the drum rotational speed sufficiently low. This permits the nozzles or spraying means to disperse the slurried material to achieve the optimum spray pattern dispersion, defined by the proper free spray distance which is the distance from the cascade to the end of the nozzle tip to uniformly wet the falling particles. This optimum spray pattern dispersion, however, is obtained only if the nozzles or spraying means are correctly positioned initially for the specific drum rotational speed. While this avoids the impingement problem, it adversely affects the quality of the spray grained product obtained and reduces the capacity of the dryer or spray grainer. Both of these results are clearly not desirable. Also, if the drum rotational speed is varied, the proper free spray distance for that speed may change because the cascade of falling particles may shift transversely with respect to the longitudinal axis of the drum due to the change in rotational speed of the drum and the particles within the drum. Since the nozzles or spraying means in the prior art devices are fixed in position, the optimum spray pattern dispersion then cannot be achieved.

In other rotary drum dryer apparatus using the spray graining principle, deflector means or deflector plates were provided that ran substantially the entire length of the drum or a portion of the length of the drum. These full or partial length deflector plates would protect the spraying means or nozzles from impingement by the falling cascade of particulate substrate and would avoid the concomitant clogging of the nozzles due to slurry buildup. The deflector plate also provides a dense cascade of falling particles at a fixed distance from the spray nozzles to permit a full slurry spray pattern to be obtained.

However, if the rotational speed of the drum is varied, the optimum free spray distance mentioned above will also vary. Generally, the faster the drum rotational speed, the further outward towards the outer wall will the cascades of sprayed particles fall. This, then requires the adjustment of the nozzles or spraying means in a direction transverse to the longitudinal axis of the rotary drum to control the strike of the spray on the cascade and the fineness of the spray mist at the point of contact of the spray with the cascade. Additionally, the angle of spray of the slurry may need to be adjusted so the spray strikes the falling cascade at the proper height to ensure thorough wetting. Also, the point of contact of the spray with the cascade along its axial length in a direction parallel to the longitudinal axis may require adjustment to ensure that optimum wetting during the spraying operation and optimum drying during the drying operation are achieved.

These problems are solved in the design of the present invention by employing variably displaceable nozzles or spraying means in a rotary drum spray grainer.

SUMMARY OF THE INVENTION

It is an object of the present invention to provide a novel rotary drum for use in spray graining particulate substrates or particles which employs variably dispaceable nozzles or spraying means to ensure optimum spray pattern dispersion over the length of the spraying zone of the rotary drum.

It is another object of the present invention to provide an improved rotary drum spray grainer that permits the adjustment of the position of the nozzles or spraying means as the rotational operating speed of the drum is changed to maintain optimum spray pattern dispersion.

It is a feature of the present invention that the nozzles or spraying means are adjustable in a first direction within the rotary drum spray grainer that is parallel to the longitudinal axis of the drum.

It is another feature of the present invention that the nozzles or spraying means are adjustable in a second direction within the rotary drum spray grainer that is transverse to the longitudinal axis of the drum.

It is yet another feature of the present invention that the nozzles or spraying means are rotatably adjustable within the rotary drum spray grainer to control the angle with which the spray pattern strikes the cascade of falling spray grained particles within the spraying zone.

It is an advantage of the present invention that the free spray distance of the spray can be varied in response to changed drum rotational speeds or other operating factors to obtain the optimum spray pattern dispersion within the spraying zone.

It is another advantage of the present invention that localized overwetting of the spray grained particles is avoided.

It is still another advantage of the present invention that balling of the spray grained particles caused by the sticking together of overwet particles is avoided.

It is a further advantage of the present invention that the strike of the spray dispersion pattern and the fineness of the mist within the spray dispersion pattern at the point of contact with the cascade of falling particles can be controlled.

It is still another advantage of the present invention that the rotary drum spray grainer can be operated more efficiently in response to changed operating conditions by making simple and fast adjustments to the position of the nozzles or spraying means.

These and other objects, features and advantages are obtained in a rotary drum spray grainer having spraying means or nozzles that are adjustable in a first direction generally parallel to the longitudinal axial length of the drum and in a second direction that is generally transverse to the longitudinal axial length of the drum, to control, respectively, the fineness of mist and strike of the spray on the cascade of falling particles, and the location along the length of the cascade of falling particles where the spray strikes the cascade, while being rotatably adjustable to control the angle at which the spray strikes the cascade of falling particles.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view with portions cut away of a rotary drum dryer used for spray graining with a portion broken away to show the adjustability of the spraying means or nozzles in the interior of the drum in the first direction parallel to the longitudinal axis of the drum by the positioning of the spraying means or nozzles in solid and phantom lines;

FIG. 2 is a top plan view of the spray dispersion pattern of the slurry spray from one nozzle in the spray grainer;

FIG. 3 is an end elevational view of the spray grainer with portions broken away showing the adjustability of the spraying means or nozzles in the second direction transverse to the longitudinal axis of the drum by the positioning of the spraying means or nozzles' supporting means in solid and phantom lines;

FIG. 4 is an end elevational view of the opposing end of the spray grainer with portions broken away showing the adjustability of the spraying means or nozzles in the second direction transverse to the longitudinal axis of the drum by the positioning of the spraying means or nozzles' support means in solid and phantom lines;

FIG. 7 is a side perspective view of the overlapping cover plate used to obtain a tight fit about the slurry infeed pipes.

DETAILED DESCRIPTION OF THE PREFERRED EMBODIMENT

Figure 5:
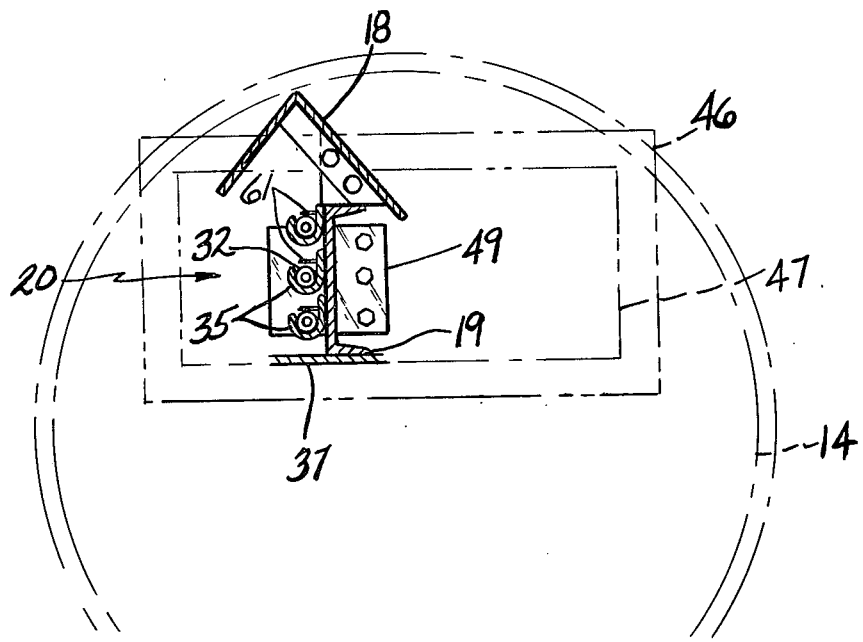
FIG. 5 is a diagramatic sectional illustration taken along the lines 5—5 of FIG. 1 showing the spraying means or nozzles' support means within the spray grainer.

Referring to FIG. 1, there is shown a rotary drum spray grainer, indicated generally by the numeral 10, with a portion cut away to show a portion of its interior. The inlet hot air or hot gas plenum 11 is shown positioned adjacent a first end of the rotary drum spray grainer 10. An inlet 12 with reduced diameter at the first end leads into the interior of the rotary drum spray grainer 10. The rotary drum spray grainer 10 has a drum 14, generally cylindrical in shape, that extends along a longitudinal axis from a position adjacent the inlet hot air plenum 11 to a position adjacent the outlet hot air plenum 16. A recycle chute 15 is shown winding in a helical pattern about the outside of the drum 14 to recycle product and fines from the second end of the rotary drum spray grainer 10 adjacent the outlet hot air plenum 16 to the first end of the rotary drum spray grainer 10 adjacent the inlet hot air plenum 11. The first end and opposing second end intersect the longitudinal axis of the drum 10.

Also shown in FIG. 1 is a deflector means or plate 18 that is appropriately mounted to a support beam 19 that runs the entire length of the apparatus, for example from the inlet hot air plenum 11 to the outlet hot air plenum 16. Spraying means, indicated generally by the numeral 20, usually in the form of spray nozzles as seen in FIGS. 1 and 2, are positioned in a spraying zone 21 that underlies the deflector means 18. The spraying means 20 may be supported by the support beam 19, if appropriate. A drying zone 22 is intermediate the spraying zone and the opposing second end of the rotary drum spray grainer 10 adjacent the outlet hot air plenum 16. In FIG. 1, an appropriate type of conveyor, such as a screw conveyor (not shown) may be provided to feed seed particles and fines through the inlet 12 into the interior of the drum 14.

A product discharge 24 leads to the final dryer (not shown). Spray grained particles enter the product discharge 24 by a rolling bed classification process which permits the larger spray grained particles to pass over the inlet 12 with its reduced diameter, seen in FIG. 1, when the depth of the particle bed (not shown) is sufficiently great.

Recycle chute 15 has a recycle chute pick-up (not shown) adjacent the second end of the rotary drum spray grainer 10 to permit spray grained particles and the fines to enter the recycle chute 15 and be returned to an area adjacent the first end or inlet 12 of the rotary drum spray grainer 10. Rolling bed classification occurs at this point to permit the full sized spray grained particles to exit into the product discharge 24 and the remainder to be cycled through the rotary drum spray grainer 10 for additional spraying until full sized spray grained particles are obtained. A full dam ring (not shown) may be employed to control the entry of spray grained particles into the recycle chute pick-up (not shown). This full dam ring would pass through 360° about the entire internal periphery of the drum 14.

The drum 14 is mounted on a support beam (not shown) to which are fastened bearings 25 and trunnions 26 (both only shown on one end of the drum) which support the drum for rotational movement. A rotating trunnion wheel 28 (only one of which is shown) may be positioned at each end of the drum 14 between the bearings 25 to engage, for example, a metal track 29 (only one of which is shown) to guide the drum 14 in its rotary movement. A drive sprocket (not shown) is employed adjacent one end of the drum 14 to provide the driving force to rotate the drum at the predetermined rotational speeds.

The spraying means 20 are appropriately mounted to a support means, such as support beam 19, to permit movement in a first direction that is parallel to the longitudinal axis of the drum 14. This adjustability is best seen in FIG. 1 wherein the spraying means 20 is shown as being three spraying nozzles 30 connected via an elbow 31 to spray infeed pipes 32. The nozzles 30 are shown in solid lines in their fully extended position and in dotted lines in a fully retracted position to illustrate the degree of adjustability possible in the first direction.

FIG. 2 shows in greater detail a nozzle 30, elbow 31 and slurry infeed pipe 32, as well as the slurry spray pattern dispersion 34.

Figure 6:
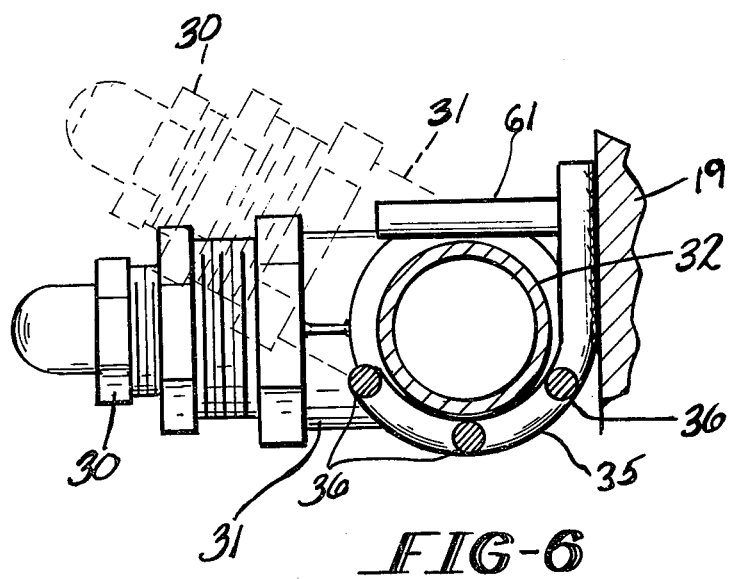
FIG. 6 is an enlarged partial sectional view taken along the lines 6—6 of FIG. 1 of a support bracket within which the spraying means or nozzle's infeed pipe is placed to permit both adjustment in the first direction parallel to the longitudinal axis of the drum by sliding the infeed pipe therealong and rotational adjustment of the spray angle of the nozzle by rotation of the infeed pipe with the attached nozzle therein.

The slurry infeed pipes 32 are supported by brackets 35 that are fastened appropriately to the side of the support beam 19. The bracket 35 is rounded in shape to form a cradle compatible with the shape of the infeed pipe 32 and can include a plurality of round shaped rods 36 that extend along the axial length of the support beam 19 for a desired distance, see briefly FIG. 1. As seen in FIG. 6, the bracket 35 with the rods 36 forms a cradle for the infeed pipe 32, but is still open-bottomed between the rods 36 to permit any particles that may fall therebetween to pass through.

To adjust or change the position of the spraying means or nozzles 20 in the first direction, an operator of the rotary drum spray grainer 10 may grasp the slurry infeed pipes 32 outside the opposing second end of the rotary drum spray grainer 10 adjacent the outlet hot air plenum 16 and either push the pipes 32 inwardly or pull them outwardly, as appropriate. This will properly position the nozzles 30 to control the strike of the slurry spray pattern dispersion 34 along the axial length of the cascade of flowing particles. This adjustment in the first direction assures that a uniform dispersion of the slurry spray pattern 34 is achieved by the three nozzles 30 along the longitudinal axial length of the drum and along the cascade of falling particles in the spraying zone 21. It will also avoid overlapping of the slurry spray pattern dispersion 34 from each nozzle to prevent overwetting of the falling particles. This adjustability also permits the uniform adjustment of all three spraying nozzles along the axial length of the drum 14 to ensure that the spray dispersion occurs at the optimum location within the spraying zone only and does not extend into the drying zone.

Adjustment of the spraying means 20 in the second direction transverse to the longitudinal axis of the drum 14 is achieved by sliding the end cover plate assemblies 38 and 39 of FIG. 1 covering the first end adjacent the inlet hot air plenum 11 and the second opposing end adjacent the outlet hot air plenum 16, respectively. As seen in FIG. 1, appropriate retaining means, such as clamps 40 with screws 41 fit over the top of cover plates 38 and 39 to engage the upper and lower outwardly extending lips 42 and 43 adjacent the inlet hot air plenum 11 and the outlet hot air plenum 16, respectively. By tightening the screws 41, the end cover plate assemblies 38 and 39 are forced against their corresponding outwardly extending lips 42 and 43, respectively. The end cover plate assemblies 38 and 39 are connected to the support beam in a manner that will be described in further detail hereinafter. By loosening the clamps 40, it can be seen that the end cover plate assemblies 38 and 39 and the connected support beam 19 may be slid in a direction transverse to the longitudinal axis of the drum 14. This movement uses the supporting ledges 37 adjacent the lower outwardly extending lips 42 and 43, respectively, as tracks along which to slide the support beam 19. Sealing gaskets may be provided to ensure a tight seal and to also provide a surface along which the beam 19 may slide on the supporting ledges 37. It can also be seen in FIG. 1 that the opposing second end of the drum adjacent the outlet hot air plenum 16 has an overlapping cover plate 44.

The cover plate assemblies 38 and 39 are best seen in FIGS. 3 and 4. Cover plate assemblies 38 and 39 extend beyond the access openings 47 which provide access to the interior of the drum 14 on both ends of the spray grainer 10.

Cover plate assembly 38 is shown in FIG. 3 as consisting of removable end plate 45 and main cover plate 46. Both removable end plate 45 and main cover plate 46 are held in place against the outwardly extending lips 42 of FIG. 1 adjacent the inlet hot air plenum 11 by a plurality of clamps 40. Handles 48 extend outwardly from the main cover plate 46. Main cover plate 46 has a portion cut away to show the support beam 19 and the angle plate 49 which is appropriately fastened, such as by bolting or welding to the support beam 19 and to the main cover plate 46. The support beam 19 is shown in a left-most position in FIG. 3 in solid lines and shown in an adjusted right position in phantom lines. The end cover plate assembly 38 is similarly shown in a left-most position in solid lines and in dotted or phantom lines in the adjusted right-most position.

FIG. 4 shows the end cover plate assembly 39 adjacent the outlet hot air plenum 16 on the opposing second end of the rotary spray grainer 14. An overlapping cover plate 44 is provided that is placed on top of the main cover plate 50 to fit around the slurry infeed pipes 32 to prevent the inrush of cold air into the drum 14 or the outrush of warm air therefrom. The overlapping cover plate 44 is shown in greater detail in FIG. 7 and will be described further hereinafter. Handles 52 are shown on the main cover plate 50 to permit the cover plate to be grasped and slid transversely to the longitudinal axis of the drum 14.

Main cover plate 50 has a pipe bracket plate 54 fastened to it and extending outwardly therefrom at a right angle in a direction generally parallel to the longitudinal axis of the drum 14, best seen in FIGS. 1 and 4. Pipe bracket plate 54 is appropriately fastened to the main cover plate 50, such as by welding or bolts. Pipe bracket plate 54 serves as a support for the slurry infeed pipes 32 that lead into the nozzles 30. U-shaped brackets 55 secure the slurry infeed pipes 32 to the pipe bracket plate 54.

The support beam 19, not shown in FIG. 4, is fastened to the main cover plate 50 in the same manner as it is fastened to the main cover plate 46 on the opposing first end, such as by an angle plate that is welded or bolted to the beam 19 and the cover plate 50. The main cover plate 50 is shown in solid lines in its fully outward position and in dotted or phantom lines in an adjusted inward position to show the possible amount of movement of the support beam 19 when adjusted transversely to the longitudinal axis of the drum.

Access or view ports 56 and 58 are provided on each end of the spray grainer 10 to permit observation and limited entry to the interior.

The overlapping cover plate 44 is shown in a perspective view in FIG. 7. It is best seen there that handle 59 permits the overlapping cover plate 44 to be grasped and removed completely from the end cover plate assembly 39 when the clamps 40 have been loosened. The overlapping cover plate 44 has three inset grooves 60 that fit about the slurry infeed pipes 32 to create a relatively tight seal to prevent the flow of cool outside air into the drum 14 or the escape of warm drying air out of the drum 14.

FIG. 5 is a view taken along the section line 5—5 of FIG. 1 in a direction parallel to the longitudinal axis of the drum 14 and shows the positioning of the support beam 19 with respect to one of the access openings 47. The deflector means is shown overlying the support beam 19 and the spraying means 20 to provide a cover for the individual nozzles 30 (not shown) to prevent the falling particles from dropping onto the nozzles and, particularly, to provide a cascade or a curtain of falling particles a desired distance from the nozzles 30. The deflector means 18 can be separate from the support beam 19 and/or the spraying means 20 so that spraying means 20 may be adjusted in the second direction transverse to the longitudinal axis of the drum 14 without moving the deflector means 18 to obtain the proper free spray distance.

As seen in FIG. 5, the brackets 35 are appropriate fastened to the support beam 19, such as by welding, and then have slurry infeed pipes 32 placed therein. A retaining bar 61 may be fastened to the upper portion of the bracket 35 to prevent the slurry infeed pipes 32 from lifting out of the cradle formed by the bracket 35 and the elongate rods 36.

FIG. 6 shows the rotational adjustability of the nozzles 30 to vary the spray angle of the slurry into the cascade of falling particles. The nozzles 30 may be rotated upwardly or downwardly about an axis generally parallel to the longitudinal axis of the drum so that the strike of the spray into the falling cascade is at the proper vertical position to ensure optimum wetting and spraying within the spraying zone 21. This type of a rotational adjustment system is possible because the slurry infeed pipes 32 are merely rotated within the cradle formed by the brackets 35 to position the nozzles 30 at the proper spray angle. This results in the movement of the strike of the spray dispersion pattern 34 into the cascade of falling particles upwardly or downwardly, as appropriate, in a generally vertical direction. It should be noted, however, that this vertical adjustment could be accomplished by simply providing a mechanism whereby the nozzles 30 and the slurry infeed pipes 32 are themselves vertically adjusted. The rotational adjustability could equally well be provided with this type of vertical adjustment system for the nozzles to incorporate both features.

The slurry spray pattern 34 shown in FIG. 2 illustrates the importance of where the cascade of falling particles strikes this slurry spray dispersion pattern 34. As seen in FIG. 2 a dense highly moist area 34A is closest to the nozzle 30 where the slurry spray exits. It is in this area that the slurry spray is most dense and overwetting of the spray grained particles will occur should they fall through that part of the slurry spray dispersion pattern 34. About midway through the slurry spray dispersion 34 at location 34B the slurry density begins to disperse and some spreading occurs. However, at this location the dispersion is still not sufficient to obtain maximum broadcasting or dispersion in a direction parallel to the longitudinal axis of the drum and some overwetting of the falling particles could occur if the cascade enters the slurry spray dispersion pattern 34 at this point. The optimum point of entry of the cascade of falling particles is shown at location 34C where the desired density and broadcast of the slurry spray pattern are achieved in the longitudinal direction and the density of the spray particles is such that localized overwetting of the falling particles will not occur. This figure illustrates how the adjustment in the second direction transverse to the longitudinal axis of the drum 14 will permit the spraying means 20 to be positioned so that cascades of falling particles fall vertically into this slurry spray dispersion pattern 34 at the desired point 34C. It also illustrates the importance of the adjustment in the first direction parallel to the longitudinal axis of the drum 14 to permit the entire longitudinal length of the spraying zone 21 to be covered with very small overlp of the slurry spray dispersion patterns 34 from the nozzles 30 by the proper positioning of each individual nozzle 30 in the first direction, In operation, a calcium hypochlorite slurry is prepared from a filter cake obtained from an appropriate filter. The slurry is prepared by mixing with water until a paste consistency similar to that of soft ice-cream is obtained, corresponding to approximately about 50 to about 59% composition of water by weight.

The rotary drum 10 is set to the desired angle from the horizontal to affect the bed transport rate, if necessary. Generally, however, the rotary drum spray grainer 10 will be set generally horizontally.

The rotary drum spray grainer 10 is heated by feeding in the heated air or other inert gas to raise the temperature of the rotary drum spray grainer 10 and its metal to the desired level. A bed of particles (not shown) is built up in the bottom of the drum to a level until the bed begins to overflow the drum inlet 12. A predetermined desired amount of seed particles is fed into the drum spray grainer 10 via the screw conveyor feed inlet means (not shown) after the bed has been heated to approximately 140° to about 150° F. This temperature of the bed 41 is determined for example, by placing a temperature probe under the surface of the rolling bed. At a predetermined time after the seed particle flow has started, such as approximately one minute, spraying from the spraying means 20 of the slurry may commence. The air flow of heated air or other inert gas is maintained at a uniform rate to achieve maximum efficiency in the drying. The air inlet temperature can vary from approximately 260° F. to approximately 390° F., although the preferred temperature is between about 310° F. and about 360° F. Rotation of the drum commences with the infeed of the heated air prior to the loading of the drum, seed flow and spraying.

As the drum rotates, the lifting flights (not shown) about the interior of the drum agitate and carry portions of the bed (not shown) upwardly until the particles begin to fall from the lifting flights (not shown) in cascades (also not shown) when the angle of repose is exceeded. When this occurs in the spraying zone 21 the cascades fall downwardly by striking the deflector means 18 and by being deflected into one thick cascade, falling closer to the outer wall of the drum 14 where the nozzles 30 disperse the slurry in a predetermined pattern to optimize the wetting of the particulate substrate to effect the spray graining. In this manner the particles may pass through the spray pattern more than once.

When the particles have fallen to the bottom of the bed and continued their axial movement through the spraying zone 21 to the drying zone 22, the rotation of the drum 14 causes the lifting flights (not shown) to carry the particles upwardly from the bed (not shown) again until a height is reached as the drum rotates where the angle of repose is exceeded. Particles then fall in a generally substantially uninterrupted downward path through the drying zone 22 where they are exposed to the heated air or gas passing through the rotary drum spray grainer 10. This generally uninterrupted downward path of the particles permits maximum heat transfer to occur in the drying zone 22. The prevention of hot air channelling in the drying zone permits heat exchange to occur across the full width or the entire cross-sectional area of the drying zone.

When the particles in the bed (not shown) reach the second end of the rotary drum spray grainer 10 adjacent the outlet hot air plenum 16, they enter the recycle chute pickup (not shown). The particles are then conveyed within the recycle chute 15 by the rotational movement of the drum 14 back to an area within the rotary drum spray grainer 10 interiorly of the partial dam ring (not shown) where they are redeposited with any fines into the interior of the drum. As the drum 14 rotats, the spray grained particles of the desired type rise to the top and pass around and over the partial dam ring (not shown) into an area where rolling bed classification is achieved and the product exits the rotary drum spray grainer 10 through the product discharge 24. Product particles that are undersized or fines that do not pass around or over the partial dam ring and out the inlet 12 into the product discharge 24 are then recycled through the spraying zone 21 and the drying zone 22 until the particles have achieved the desired size.

The heated air or other inert gas contacts the calcium hypochlorite particles wetted with the slurry to simultaneously evaporate and remove water and to deposit a thin layer of the calcium hypochlorite containing component of the slurry on the surface of the wetted particles. The coated particles continue in the moving bed (not shown) and continue to be lifted, dropped and coated until they are discharged from the rotary drum spray grainer 10 as previously described. As the number and size of the calcium hypochlorite granules or particles coated with the slurry composition increases, the moving bed (not shown) builds up beyond the discharge retaining partial dam ring (also not shown) until a level is reached where the particles pass over the drum inlet 12 and fall into the product discharge 24. From the product discharge 24 they pass into the final dryer (not shown).

Should it be determined after operation of the spray grainer 10 for a period of time that optimized spray of the slurry is not being achieved or overwetting is occurring, the spraying means 20 may be adjusted in the following manner.

Should full length spraying across the longitudinal length of the spraying zone 21 not be achieved, the individual slurry infeed pipes 32 may be loosened in their U-shaped brackets 55 and slid in the appropriate way in the first direction generally parallel to the longitudinal axis of the drum 14. This should permit the individual nozzles 30 to be positioned so that the slurry spray dispersion pattern 34 can cover the entire spraying zone 21.

Should adjustment in the second direction transverse to the generally longitudinal axis of the drum 14 be required, the clamps 40 are loosened or removed by loosening the screws 41. An operator on each end of the spray grainer 10 then grasps the handles 48 of the main cover plate 46 adjacent the first end of the drum and the handles 52 of the main cover plate 50 adjacent the opposing second end of the drum. The operators then slide the support beam 19, connected to the main cover plates 46 and 50, along the supporting ledges 37 until the spraying means 30 is positioned so that the desired free spray distance is established between the nozzles 30 and the cascade of falling particles. If the main cover plates 46 and 50 are slid far enough, it may be necessary to remove the removable end plates 45 and 51 from their respective ends of the spray grainer 10. It may also be necessary, prior to sliding the support beam 19 in the second direction, to remove the overlapping cover plate 44 at the second end of the spray grainer 10.

Lastly, should the angle or strike of the slurry spray dispersion pattern 34 into the cascade of falling particles need to be changed, the U-shaped brackets 55 may be loosened on the pipe bracket plate 54 and the slurry infeed pipes 32 rotated as shown in FIG. 6 to position each of the nozzles 30 at the desired angle of spray.

When all adjustments are completed, the U-shaped brackets 55 will be retightened and the main cover plates 46 and 50 resecured by the replacement or the tightening of clamps 40.

The composition of the slurry may vary considerably, with any pumpable and sprayable calcium hypochlorite slurry containing from about 45% to about 90% by weight of water and preferrably from about 50 to about 60% by weight of water being employable. Generally, the slurry is prepared by admixing water with the filter cake, a calcium hypochlorite produced in any conventional commercial calcium hypochlorite process. Although water is normally used to make up the slurry, any suitable recycle liquid such as a portion of the filtrate produced in commercial calcium hypochlorite processes, scrubber liquor, or other aqueous medium that is inert to calcium hypochlorite may be employed.

The controlling factor in the preparation of this slurry is the percentage by weight of water that is present. Where the percentage by weight of water is below about 45% by weight, the resulting slurry is extremely difficult to pump and spray because it is too viscous and is cake-like, restricting the flow through the pipeline to the spraying means or nozzle. It could also plug the nozzle at this percentage. Where the water concentration is above about 90% by weight, an extremely large amount of water must be evaporated. As a result, the feed rate must be reduced and the production rate is reduced. Furthermore, there is likely to be excessive decomposition of the available chlorine in the calcium hypochlorite particles when the moist calcium hypochlorite particles must be exposed to the heated atmosphere in the drying zone and the final dryer for the extended periods of time that are necessary to effect the evaporation of excessive amounts of water.

It should be noted that the proportion of impurities in the calcium hypochlorite slurry will vary with the type of process employed to prepare the calcium hypochlorite filter cake and also with the nature of the lime initially used to prepare the calcium hypochlorite. A representative analysis of a typical calcium hypochlorite filter cake prepared by commercial process and a typical preferred analysis range for the calcium hypochlorite filter cake used to prepare the slurry sprayed from the nozzles 30 in the slurry dispersion pattern 34 and useful as the starting material in the preparation of particles by the spray graining technique are shown in Table I. This slurry is obtained from the filter cake, for example, by the addition of water.

TABLE I

| Component | Typical Filter Cake Analysis Percent by Weight | Typical Analysis Range Percent by Weight |
|---|---|---|
| Calcium hypochlorite | 45.43 | 42–48 |
| Calcium chloride | 0.44 | 0.0–1.5 |
| Calcium chlorate | 0.02 | 0.0–1.5 |
| Calcium hydroxide | 0.24 | 0.2–2.0 |
| Calcium carbonate | 0.44 | 0.1–2.0 |
| Sodium chloride | 7.75 | 6.0–8.0 |
| Water (difference) | 45.68 | 40–50 |

The rate of infeed of forced air utilized as the heated air or other inert gas can vary from about 85 to about 340 feet per minute. The temperature of the heated gas at the inlet hot air plenum 11 has previously been described. The exhaust gases pass from the rotary drum spray grainer 10 at the outlet hot air plenum 16 and can vary in range from about 130° to about 170° F.

While the preferred structure in which the principles of the present invention have been incorporated is shown and described above it is to be understood that the invention is not to be limited to the particular details thus presented, but in fact, widely different means may be employed in the practice of the broader aspects of this invention. For example, while the invention has been described herein specifically in terms of apparatus used to produce calcium hypochlorite spray grained particles, it is to be understood that the invention could equally well be employed in any apparatus used to make spray grained or merely sprayed product. This is specifically intended to include such products as fertilizers and confections. The scope of the appended claims is intended to encompass all obvious changes in the details, materials and arrangement of parts which will occur to one of skill in the art upon a reading of the disclosure, such as the use of flexible slurry infeed pipes exteriorly of the spray grainer to facilitate movement in the second direction.

What is claimed is:

1. In an elongate, hollow drum having an arcuate interior for forming spray grained particles, the particles being sprayed by a liquid slurry while falling in a cascade, the sprayed particles accumulating in a bed at the bottom of the drum, the drum being rotatably mounted on support means and having a first end and an opposing second end, the first end and opposing second end lying along the longitudinal axis of the drum, the drum being rotatable about the longitudinal axis, comprising in combination:
   a. feed inlet means for feeding said particles and product fines into the first end of the drum;
   b. support means positioned at least partially within the drum;
   c. spraying means supported by the support means for spraying the slurry in a predetermined slurry spray dispersion pattern thereby defining at least one spraying zone within the drum intermediate the first end and the opposing second end, the spraying means being adjustable at least in a first direction parallel to the longitudinal axis of the drum and in a second direction transverse to the longitudinal axis of the drum;
   d. drying means for introducing a heated gas into the drum for drying the spray grained particles;
   e. at least one drying zone intermediate the spraying zone and the opposing second end where spray grained particles fall in a downward path through the heated gas; and
   f. spray grained product particle outlet means adjacent the first end of the drum for removing the product particles from the drum.

2. The apparatus according to claim 1 wherein the spraying means are rotatably adjustable about an axis generally parallel to the longitudinal axis of the drum.

3. The apparatus according to claim 2 wherein the drum further has deflector means mounted therein to deflect falling seed particles, product fines and spray grained particles overlying the spraying means defining the upper limit of the spraying zone.

4. The apparatus according to claim 3 wherein the spraying means are adjustable in the second direction transverse to the longitudinal axis of the drum independently of the deflector means.

5. The apparatus according to claim 3 wherein the spraying means are adjustable in the second direction transverse to the longitudinal axis of the drum with the deflector means so that the deflector means moves with the spraying means.

6. The apparatus according to claim 2 wherein the support means further comprises at least one bracket within which the spraying means is supported.

7. The apparatus according to claim 6 wherein the spraying means further comprises at least one infeed pipe through which the liquid slurry is fed.

8. The apparatus according to claim 7 wherein the spraying means further comprises at least one nozzle connected to the at least one infeed pipe.

9. The apparatus according to claim 8 wherein the support means further comprises an elongate beam to which the at least one bracket is attached and which is adjustable in at least the second direction.

10. The apparatus according to claim 9 wherein the support beam further has a deflector means mounted thereto and moveable therewith to deflect falling seed particles, product fines and spray grained particles overlying the at least one nozzle.

11. The apparatus according to claim 8 wherein the feed inlet means is adjacent the first end of the drum.

12. The apparatus according to claim 11 wherein the at least one nozzle is adjacent the first end of the drum.

13. The apparatus according to claim 12 wherein the drying means further has an inlet at the first end.

14. The apparatus according to claim 3 wherein the deflector means is a predetermined distance from the spraying means so that the cascade of falling particles deflect off of the deflector means into the slurry spray dispersion pattern.

15. In a rotary drum with an arcuate interior having a first end and an opposing second end for spray graining seed particles with a liquid slurry while the drum is rotating having a feed inlet means adjacent the first end for feeding in seed particles and product fines, the first end and opposing second end lying along the longitudinal axis of the drum so the drum rotates about the longitudinal axis, drying means for introducing a heated gas into the drum, at least one drying zone, and spray grained product particle outlet means for removing the product particles from the drum, the improvement comprising in combination:
  (a) spraying means for spraying the liquid slurry in a predetermined slurry spray dispersion pattern defining at least one spraying zone intermediate the first end and the opposing second end, the spraying means being adjustable at least in a first direction parallel to the longitudinal axis of the drum and in a second direction transverse to the longitudinal axis of the drum; and
  (b) the spray grained product outlet means being adjacent the first end.

16. The apparatus according to claim 15 wherein the spraying means are rotatably adjustable about an axis generally parallel to the longitudinal axis of the drum.

17. The apparatus according to claim 16 wherein the drum further has deflector means mounted therein to deflect falling seed particles, product fines and spray grained particles overlying the spraying means defining the upper limit of the spraying zone.

18. The apparatus according to claim 17 wherein the spraying means are adjustable in the second direction transverse to the longitudinal axis of the drum independently of the deflector means.

19. The apparatus according to claim 17 wherein the spraying means are adjustable in the second direction transverse to the longitudinal axis of the drum with the deflector means so that the deflector means moves with the spraying means.

20. The apparatus according to claim 16 wherein the spraying means further comprises at least one infeed pipe through which the liquid slurry is fed.

21. The apparatus according to claim 20 wherein the spraying means further comprises at least one nozzle connected to the at least one infeed pipe.

22. The apparatus according to claim 21 wherein the at least one nozzle is adjacent the first end of the drum.

23. The apparatus according to claim 22 wherein the drying means further has an inlet at the first end.

24. In an elongate, hollow drum having an arcuate interior for forming spray grained particles, the particles being sprayed by a liquid slurry while falling in a cascade, the sprayed particles accumulating in a bed at the bottom of the drum, the drum being rotatably mounted on support means and having a first end and an opposing second end, the first end and opposing second end lying along the longitudinal axis of the drum, the drum being rotatable about the longitudinal axis, comprising in combination:
  a. feed inlet means for feeding seed particles and product fines into the drum;
  b. support means positioned at least partially within the drum;
  c. spraying means supported by the support means for spraying the slurry in a predetermined slurry spray dispersion pattern thereby defining at least one spraying zone within the drum intermediate the first end and the opposing second end, the spraying means being adjustable at least in a first direction parallel to the longitudinal axis of the drum and in a second direction transverse to the longitudinal axis of the drum;
  d. drying means for introducing a heated gas into the drum for drying the spray grained particles;
  e. deflector means mounted within the drum to the support means and moveable therewith overlying the spraying means to deflect falling seed particles, product fines and spray grained particles thereby defining the upper limit of the spraying zone, the deflector means further being adjustable in the second direction transverse to the longitudinal axis of the drum so that the deflector means moves with the spraying means;
  f. at least one drying zone intermediate the spraying zone and the opposing second end where spray grained particles fall in a downward path through the heated gas; and
  g. spray grained product particle outlet means for removing the product particles from the drum.

25. The apparatus according to claim 24 wherein the spraying means are rotatable adjustable about an axis generally parallel to the longitudinal axis of the drum.

26. The apparatus according to claim 25 wherein the support means further comprises at least one bracket within which the spraying means is supported.

27. The apparatus according to claim 26 wherein the spraying means further comprises at least one infeed pipe through which the liquid slurry is fed.

28. The apparatus according to claim 27 wherein the spraying means further comprises at least one nozzle connected to the at least one infeed pipe.

29. The apparatus according to claim 28 wherein the support means further comprises an elongate beam to which the at least one bracket is attached and which is adjustable in at least the second direction.

30. The apparatus according to claim 28 wherein the feed inlet means is adjacent the first end of the drum.

31. The apparatus according to claim 30 wherein the at least one nozzle is adjacent the first end of the drum.

32. The apparatus according to claim 31 wherein the spray grained product outlet means is adjacent the first end.

33. The apparatus according to claim 32 wherein the drying means further has an inlet at the first end.

34. The apparatus according to claim 33 wherein the deflector means is a predetermined distance from the spraying means so that the cascade of falling particles deflect off of the deflector means into the slurry spray dispersion pattern.

35. In a rotary drum with an arcuate interior having a first end and an opposing second end for spray graining seed particles with a liquid slurry while the drum is rotating having a feed inlet means adjacent the first end for feeding in seed particles and product fines, the first end and opposing second end lying along the longitudinal axis of the drum so the drum rotates about the longitudinal axis, drying means for introducing a heat gas into the drum, at least one drying zone, and spray grained product particle outlet means for removing the product particles from the drum, the improvement comprising in combination:

(a) spraying means for spraying the liquid slurry in a predetermined slurry spray dispersion pattern defining at least one spraying zone intermediate the first end and the opposing second end, the spraying means being adjustable at least in a first direction parallel to the longitudinal axis of the drum and in a second direction transverse to the longitudinal axis of the drum; and (b) deflector means mounted within the drum overlying the spraying means to deflect falling seed particles, product fines and spray grained particles to define the upper limit of the spraying zone, the deflector means being adjustable in the second direction with the spraying means so that the deflector means moves with the spraying means.

36. The apparatus according to claim 35 wherein the spraying means are rotatably adjustable about an axis generally parallel to the longitudinal axis of the drum.

37. The apparatus according to claim 36 wherein the spraying means further comprises at least one infeed pipe through which the liquid slurry is fed.

38. The apparatus according to claim 37 wherein the spraying means further comprises at least one nozzle connected to the at least one infeed pipe.

39. The apparatus according to claim 38 wherein the at least one nozzle is adjacent the first end of the drum.

40. The apparatus according to claim 39 wherein the spray grained product outlet means is adjacent the first end.

41. The apparatus according to claim 40 wherein the drying means further has an inlet at the first end.

* * * * *

UNITED STATES PATENT AND TRADEMARK OFFICE
CERTIFICATE OF CORRECTION

PATENT NO. : 4,478,171

DATED : October 23, 1984

INVENTOR(S) : Bridges et al

It is certified that error appears in the above-identified patent and that said Letters Patent is hereby corrected as shown below:

In column 9, at line 56 "rotats," should be --rotates,--.

In column 12, at line 18 "said" should be --seed--.

In column 14, at line 42 "rotatable" should be --rotatably--.

Signed and Sealed this

Eighteenth Day of June 1985

[SEAL]

Attest:

DONALD J. QUIGG

Attesting Officer Acting Commissioner of Patents and Trademarks